United States Patent
Kawano et al.

(10) Patent No.: US 11,652,377 B2
(45) Date of Patent: May 16, 2023

(54) ROTOR OF ROTARY ELECTRIC MACHINE, PERMANENT MAGNET ASSEMBLY, AND METHOD FOR MANUFACTURING ROTOR OF ROTARY ELECTRIC MACHINE

(71) Applicant: HONDA MOTOR CO., LTD., Tokyo (JP)

(72) Inventors: Yusuke Kawano, Saitama (JP); Taisuke Maruyama, Saitama (JP); Tomohiro Kota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/130,805

(22) Filed: Dec. 22, 2020

(65) Prior Publication Data

US 2021/0194300 A1    Jun. 24, 2021

(30) Foreign Application Priority Data

Dec. 23, 2019   (JP) .............................. JP2019-231845

(51) Int. Cl.
*H02K 1/27*       (2022.01)
*H02K 15/03*     (2006.01)
*H02K 1/278*     (2022.01)

(52) U.S. Cl.
CPC ............. *H02K 1/278* (2013.01); *H02K 15/03* (2013.01)

(58) Field of Classification Search
CPC ...... H02K 1/278; H02K 15/03; H02K 1/2766; H02K 1/27; H02K 1/28; H01F 7/0221
See application file for complete search history.

(56) References Cited

U.S. PATENT DOCUMENTS

2003/0041956 A1*  3/2003  Pigott .................. B29C 66/836
                                                                52/630
2014/0103772 A1    4/2014  Kingrey et al.
2019/0326042 A1* 10/2019  Takagi ....................... C09J 5/08

FOREIGN PATENT DOCUMENTS

CN       104854781 A     8/2015
JP       2006-311782 A  11/2006
(Continued)

OTHER PUBLICATIONS

Mar. 8, 2022 Japanese Office Action issued for related JP Application No. 2019-231845.
(Continued)

*Primary Examiner* — Thomas Truong
(74) *Attorney, Agent, or Firm* — Paratus Law Group, PLLC (57) ABSTRACT

A rotor of a rotary electric machine includes a rotor core having a magnet insertion hole and a permanent magnet. A magnet insertion hole has an inner diameter side wall surface and an outer diameter side wall surface. A permanent magnet has an inner diameter surface and an outer diameter surface. The rotor further includes a foam adhesive sheet provided at least either between the inner diameter surface and the inner diameter side wall surface or between the outer diameter surface and the outer diameter side wall surface. The foam adhesive sheet includes a foam layer and an adhesive layer stacked in a radial direction. The foam layer is closely fixed to the permanent magnet. The adhesive layer faces the magnet insertion hole. The foam layer is foamed, the adhesive layer closely contacts with the magnet insertion hole, and the permanent magnet is fixed to the magnet insertion hole.

13 Claims, 5 Drawing Sheets

(56) References Cited

FOREIGN PATENT DOCUMENTS

| | | |
|---|---|---|
| JP | 2012-016237 A | 1/2012 |
| JP | 2012-244838 A | 12/2012 |
| JP | 2015-035888 A | 2/2015 |
| JP | 2017-052950 A | 3/2017 |

OTHER PUBLICATIONS

Jan. 12, 2023, Japanese Opposition issued for related JP Patent No. 7079763.
Mar. 14, 2023, Japanese Notice of Reasons for Revocation issued for related JP Application No. 2019-231845.

* cited by examiner

ROTOR OF ROTARY ELECTRIC MACHINE, PERMANENT MAGNET ASSEMBLY, AND METHOD FOR MANUFACTURING ROTOR OF ROTARY ELECTRIC MACHINE

CROSS-REFERENCE TO RELATED APPLICATIONS

This application is based on and claims priority under 35 USC 119 from Japanese Patent Application No. 2019-231845 filed on Dec. 23, 2019.

TECHNICAL FIELD

The present disclosure relates to a rotor of a rotary electric machine to be mounted on an electric vehicle, a permanent magnet assembly used in a rotor of a rotary electric machine, and a method for manufacturing a rotor of a rotary electric machine.

BACKGROUND ART

In the related art, a so-called IPM motor including a plurality of permanent magnets arranged at predetermined intervals in a circumferential direction inside a rotor core is known as a rotor used in a rotary electric machine. In such an IPM motor, for example, a technique disclosed in JP-A-2015-035888 (Patent Literature 1) is known as a method for fixing the permanent magnets to the rotor core.

Patent Literature 1 discloses a rotor of a rotary electric machine in which a permanent magnet having a foam sheet attached thereto is housed in a magnet insertion hole and is fixed to the magnet insertion hole with a resin injected under pressure into the magnet insertion hole, the foam sheet being formed by sandwiching a foam layer between an adhesive layer and a protective film.

SUMMARY OF INVENTION

In the rotor of a rotary electric machine of Patent Literature 1, however, it is necessary to inject the resin into the magnet insertion hole to fix the permanent magnet to the magnet insertion hole.

For this reason, there is problems that a step of injecting the resin into the magnet insertion hole and facilities for doing so are necessary, and the number of steps is increased, and the manufacturing cost is increased.

The present disclosure provides a rotor of a rotary electric machine, a permanent magnet assembly, and a method for manufacturing a rotor of a rotary electric machine, in which a permanent magnet can be fixed to a magnet insertion hole of the rotor without injecting a resin for fixing the permanent magnet in the magnet insertion hole of the rotor.

According to the present disclosure, there is provided a rotor of a rotary electric machine, including: a substantially annular rotor core having a plurality of magnet insertion holes arranged along a circumferential direction; and a plurality of permanent magnets inserted into the plurality of magnet insertion holes, in which a magnet insertion hole of the plurality of magnet insertion holes has an inner diameter side wall surface extending in the circumferential direction on a radially inner side and an outer diameter side wall surface extending in the circumferential direction on a radially outer side relative to the inner diameter side wall surface, in which a permanent magnet of the plurality of permanent magnets has an inner diameter surface facing the inner diameter side wall surface of the magnet insertion hole and an outer diameter surface facing the outer diameter side wall surface of the magnet insertion hole, in which the rotor further comprises: a foam adhesive sheet provided at least either between the inner diameter surface of the permanent magnet and the inner diameter side wall surface of the magnet insertion hole or between the outer diameter surface of the permanent magnet and the outer diameter side wall surface of the magnet insertion hole, the foam adhesive sheet including a foam layer and an adhesive layer stacked in a radial direction, in which the foam layer is closely fixed to the permanent magnet, in which the adhesive layer faces the magnet insertion hole, and in which the foam layer is foamed, the adhesive layer closely contacts with the magnet insertion hole, and the permanent magnet is fixed to the magnet insertion hole.

According to the present disclosure, there is a permanent magnet assembly including: a permanent magnet; and a foam adhesive sheet closely fixed to at least one side surface of the permanent magnet, in which the permanent magnet assembly is inserted into a magnet insertion hole formed in a substantially annular rotor core, and in which the foam adhesive sheet includes a foam layer and an adhesive layer stacked with each other, and the foam layer is closely fixed to the permanent magnet.

According to the present disclosure, there is a method for manufacturing a rotor of a rotary electric machine, the rotor including: a substantially annular rotor core having a plurality of magnet insertion holes arranged along a circumferential direction; and a plurality of permanent magnets inserted into the plurality of magnet insertion holes, a magnet insertion hole of the plurality of magnet insertion holes having an inner diameter side wall surface extending in the circumferential direction on a radially inner side and an outer diameter side wall surface extending in the circumferential direction on a radially outer side relative to the inner diameter side wall surface, a permanent magnet of the permanent magnets having an inner diameter surface facing the inner diameter side wall surface of the magnet insertion hole and an outer diameter surface facing the outer diameter side wall surface of the magnet insertion hole, the method including: a permanent magnet assembly forming step in which a foam adhesive sheet is closely fixed to at least one of the inner diameter surface and the outer diameter surface of the permanent magnet to form a permanent magnet assembly, the foam adhesive sheet including a foam layer and an adhesive layer stacked in a radial direction; a permanent magnet assembly inserting step in which the permanent magnet assembly is inserted into the magnet insertion hole; and a permanent magnet fixing step in which the permanent magnet is fixed to the magnet insertion hole by foaming the foam layer of the permanent magnet assembly inserted into the magnet insertion hole, in which in the permanent magnet assembly forming step, the foam adhesive sheet is closely fixed to the permanent magnet so that the foam layer is closely fixed to the permanent magnet, in which in the permanent magnet assembly inserting step, the permanent magnet assembly is inserted into the magnet insertion hole so that the adhesive layer faces the magnet insertion hole, and in which in the permanent magnet fixing step, the foam layer is foamed by heating the permanent magnet assembly inserted into the magnet insertion hole, the adhesive layer closely contacts with the magnet insertion hole, and thereby the permanent magnet is fixed to the magnet insertion hole.

According to the present disclosure, the foam layer is foamed, the adhesive layer closely contacts with the magnet insertion hole, and the permanent magnet is fixed to the magnet insertion hole of the rotor. Therefore, the permanent magnet can be fixed to the magnet insertion hole of the rotor without injecting a resin for fixing the permanent magnet to the magnet insertion hole of the rotor.

DESCRIPTION OF EMBODIMENTS

An embodiment of a rotor of a rotary electric machine of the present disclosure and an embodiment of a method for manufacturing a rotor of a rotary electric machine of the present disclosure will be described below with reference to the accompanying drawings.

[Rotor of Rotary Electric Machine]

First, the rotor of a rotary electric machine of the present disclosure will be described with reference to FIGS. 1 and 2.

Figure 1:
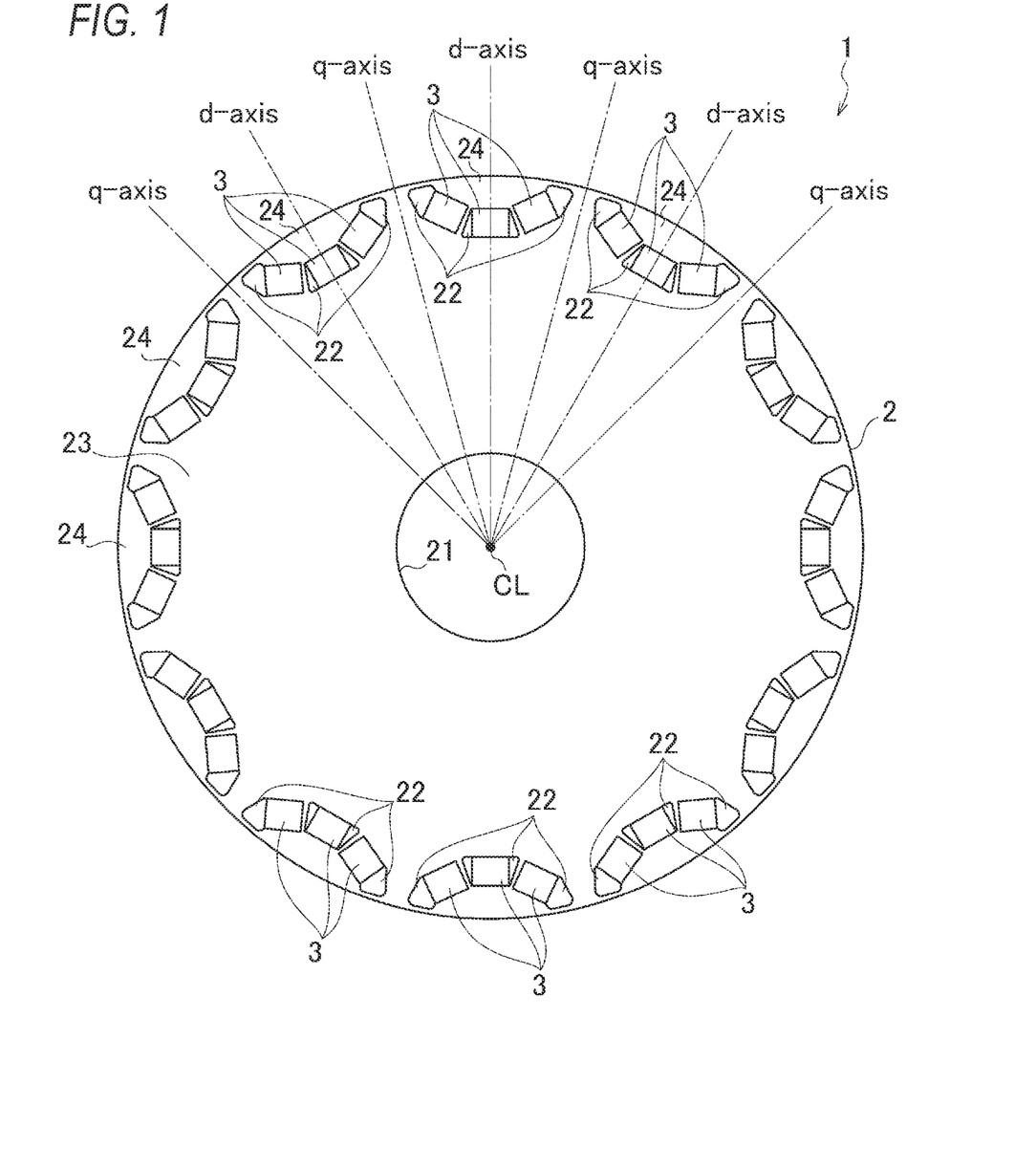
FIG. 1 is a front view of a rotor of a rotary electric machine according to an embodiment of the present disclosure.

As illustrated in FIG. 1, a rotor 1 of a rotary electric machine includes a rotor core 2 constituted by a plurality of axially stacked electromagnetic steel plates 200 (see FIG. 5) having a substantially annular shape, and a plurality of permanent magnet assemblies 3 assembled to the rotor core 2.

The rotor core 2 has an annular shape in which a rotor shaft hole 21 is provided in the center CL. A rotor shaft (not illustrated) is fastened in the rotor shaft hole 21 by press-fitting. The rotor core 2 includes an electromagnetic portion 23 having a plurality of magnet insertion holes 22 into which the permanent magnet assemblies 3 are inserted.

The electromagnetic portion 23 is disposed on an outer circumferential portion of the rotor core 2 and faces a stator (not illustrated). The electromagnetic portion 23 includes a plurality of magnetic pole portions 24 (twelve in the present embodiment) formed at substantially equal intervals in the circumferential direction. Each of the magnetic pole portions 24 is constituted by three permanent magnet assemblies 3 inserted into three magnet insertion holes 22 arranged in a substantially arc shape protruding radially inward.

Figure 2:
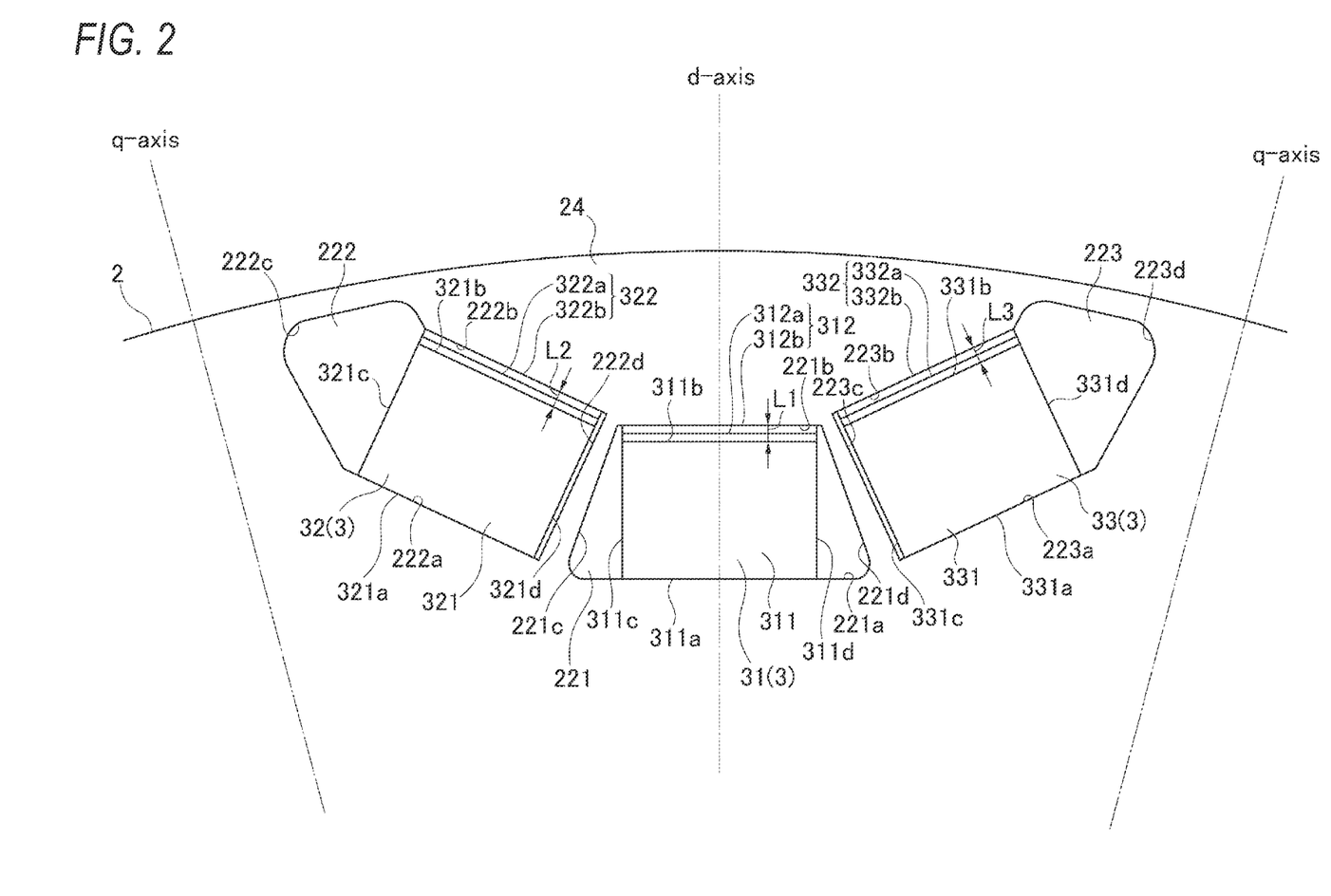
FIG. 2 is an enlarged front view of an electromagnetic portion of the rotor of a rotary electric machine of FIG. 1.

As illustrated in FIG. 2, the three magnet insertion holes 22 arranged in each of the magnetic pole portions 24 include, when a center axis of the magnetic pole portion 24 is defined as a d axis (d-axis in the drawing) and an axis 90° away from the d axis by an electrical angle is defined as a q axis (q-axis in the drawing) as viewed in the axial direction, a first magnet insertion hole 221 formed to intersect with the d axis, a second magnet insertion hole 222 formed on a first end portion side of the magnetic pole portion 24 relative to the d axis in the circumferential direction, and a third magnet insertion hole 223 formed on a second end portion side of the magnetic pole portion 24 relative to the d axis in the circumferential direction. The second magnet insertion hole 222 and the third magnet insertion hole 223 are symmetrical position and shape relative to the d axis with the first magnet insertion hole 221 interposed therebetween.

The first magnet insertion hole 221 has a substantially linear inner diameter side wall surface 221a that extends in the circumferential direction on a radially inner side and is substantially perpendicular to the d axis, a substantially linear outer diameter side wall surface 221b that extends in the circumferential direction on a radially outer side relative to the inner diameter side wall surface 221a and is substantially perpendicular to the d axis, a first end portion side wall surface 221c that extends from an end portion of the inner diameter side wall surface 221a on the first end portion side of the magnetic pole portion 24 to an end portion of the outer diameter side wall surface 221b on the first end portion side of the magnetic pole portion 24, and a second end portion side wall surface 221d that extends from an end portion of the inner diameter side wall surface 221a on the second end portion side of the magnetic pole portion 24 to an end portion of the outer diameter side wall surface 221b on the second end portion side of the magnetic pole portion 24. The first end portion side wall surface 221c and the second end portion side wall surface 221d extend substantially linearly to approach the d axis from the inner diameter side wall surface 221a to the outer diameter side wall surface 221b. The first magnet insertion hole 221 has a symmetrical shape relative to the d axis.

The second magnet insertion hole 222 has an inner diameter side wall surface 222a that extends in the circumferential direction on the radially inner side and extends substantially linearly away from the d axis toward the radially outer side, an outer diameter side wall surface 222b that extends in the circumferential direction on the radially outer side relative to the inner diameter side wall surface 222a and extends substantially linearly away from the d axis toward the radially outer side, a first end portion side wall surface 222c that extends from an end portion of the inner diameter side wall surface 222a on the first end portion side of the magnetic pole portion 24 to an end portion of the outer diameter side wall surface 222b on the first end portion side of the magnetic pole portion 24 while curving toward a circumferentially outer side of the magnetic pole portion 24, and a second end portion side wall surface 222d that extends substantially linearly from an end portion of the inner diameter side wall surface 222a on the second end portion side (that is, a d axis side) of the magnetic pole portion 24 to an end portion of the outer diameter side wall surface 222b on the second end portion side (that is, the d axis side) of the magnetic pole portion 24. The inner diameter side wall surface 222a and the outer diameter side wall surface 222b face and extend substantially parallel to each other. In the present embodiment, the second end portion side wall surface 222d of the second magnet insertion hole 222 and the first end portion side wall surface 221c of the first magnet insertion hole 221 face and extend substantially parallel to each other. Additionally, the second end portion side wall surface 222d of the second magnet insertion hole 222 and the first end portion side wall surface 221c of the first magnet insertion hole 221 may not face and extend substantially parallel to each other.

The third magnet insertion hole 223 has an inner diameter side wall surface 223a that extends in the circumferential direction on the radially inner side and extends substantially linearly away from the d axis toward the radially outer side, an outer diameter side wall surface 223b that extends in the circumferential direction on the radially outer side relative to the inner diameter side wall surface 223a and extends substantially linearly away from the d axis toward the radially outer side, a first end portion side wall surface 223c that extends substantially linearly from an end portion of the inner diameter side wall surface 223a on the first end portion side (that is, the d axis side) of the magnetic pole portion 24 to an end portion of the outer diameter side wall surface 223b on the first end portion side (that is, the d axis side) of the magnetic pole portion 24, and a second end portion side wall surface 223d that extends from an end portion of the inner diameter side wall surface 223a on the second end portion side of the magnetic pole portion 24 to an end portion of the outer diameter side wall surface 223b on the second end portion side of the magnetic pole portion 24 while curving toward a circumferentially outer side of the magnetic pole portion 24. The inner diameter side wall surface 223a and the outer diameter side wall surface 223b face and extend substantially parallel to each other. In the present embodiment, the first end portion side wall surface 223c of the third magnet insertion hole 223 and the second end portion side wall surface 221d of the first magnet insertion hole 221 face and extend substantially parallel to each other. The first end portion side wall surface 223c of the third magnet insertion hole 223 and the second end portion side wall surface 221d of the first magnet insertion hole 221 may not face and extend substantially parallel to each other.

The permanent magnet assemblies 3 inserted into the magnet insertion holes 22 include a first permanent magnet assembly 31 inserted into the first magnet insertion hole 221, a second permanent magnet assembly 32 inserted into the second magnet insertion hole 222, and a third permanent magnet assembly 33 inserted into the third magnet insertion hole 223.

The first permanent magnet assembly 31 is inserted into the first magnet insertion hole 221. The first permanent magnet assembly 31 includes a permanent magnet 311 and a foam adhesive sheet 312.

The permanent magnet 311 has an inner diameter surface 311a facing the inner diameter side wall surface 221a of the first magnet insertion hole 221, an outer diameter surface 311b facing the outer diameter side wall surface 221b of the first magnet insertion hole 221, a first end portion side end surface 311c extending from an end portion of the inner diameter surface 311a on the first end portion side of the magnetic pole portion 24 to an end portion of the outer diameter surface 311b on the first end portion side of the magnetic pole portion 24, and a second end portion side end surface 311d extending from an end portion of the inner diameter surface 311a on the second end portion side of the magnetic pole portion 24 to an end portion of the outer diameter surface 311b on the second end portion side of the magnetic pole portion 24.

The foam adhesive sheet 312 is closely fixed to the outer diameter surface 311b of the permanent magnet 311. That is, the foam adhesive sheet 312 is disposed between the outer diameter surface 311b of the permanent magnet 311 and the outer diameter side wall surface 221b of the first magnet insertion hole 221. The foam adhesive sheet 312 includes a foam layer 312a and an adhesive layer 312b stacked in the radial direction. The foam layer 312a is closely fixed to the outer diameter surface 311b of the permanent magnet 311. The adhesive layer 312b faces the outer diameter side wall surface 221b of the first magnet insertion hole 221. The foam layer 312a is foamed, the inner diameter surface 311a of the permanent magnet 311 is pressed against the inner diameter side wall surface 221a of the first magnet insertion hole 221, and the adhesive layer 312b is pressed against the outer diameter side wall surface 221b of the first magnet insertion hole 221.

The permanent magnet 311 is fixed to the first magnet insertion hole 221 since the foam layer 312a is foamed, the inner diameter surface 311a of the permanent magnet 311 is pressed against the outer diameter side wall surface 221a of the first magnet insertion hole 221, and the adhesive layer 312b is closely pressed against the outer diameter side wall surface 221b of the first magnet insertion hole 221. Therefore, the permanent magnet 311 can be fixed to the first magnet insertion hole 221 without injecting a resin for fixing the permanent magnet 311 to the first magnet insertion hole 221.

Since the foam adhesive sheet 312 is disposed between the outer diameter surface 311b of the permanent magnet 311 and the outer diameter side wall surface 221b of the first magnet insertion hole 221, a centrifugal force generated in the permanent magnet 311 during rotation of the rotor 1 can be received by the foam adhesive sheet 312, and the stress generated in the rotor core 2 due to the centrifugal force accompanying the rotation of the rotor 1 can be reduced.

Further, in a region where the foam adhesive sheet 312 is disposed, a distance L between the permanent magnet 311 and the outer diameter side wall surface 221b of the first magnet insertion hole 221 is substantially constant.

In the region where the foam adhesive sheet 312 is disposed, the distance L1 between the permanent magnet 311 and the outer diameter side wall surface 221b of the first magnet insertion hole 221 can be substantially constant since it is not necessary to provide a resin injection hole for injecting the resin for fixing the permanent magnet 311 to the first magnet insertion hole 221. In the region where the foam adhesive sheet 312 is disposed, since the distance L1 between the permanent magnet 311 and the outer diameter side wall surface 221b of the first magnet insertion hole 221 is substantially constant, it is possible to reduce a pressing force and variability in the pressing direction by the foam of the foam layer 312a when the adhesive layer 312b is pressed against the outer diameter side wall surface 221b of the first magnet insertion hole 221. Accordingly, the closeness between the foam adhesive sheet 312 and the outer diameter side wall surface 221b of the first magnet insertion hole 221 is improved, and the permanent magnet 311 can be more firmly fixed to the first magnet insertion hole 221. Further, since it is not necessary to provide the rotor core 2 with a resin injection hole for injecting the resin for fixing the permanent magnet 311 to the first magnet insertion hole 221, an iron amount of the rotor core 2 around the permanent magnet 311 can be increased, and the output performance of the rotary electric machine is improved.

In the present embodiment, the foam adhesive sheet 312 is disposed substantially over the entire outer diameter surface 311b of the permanent magnet 311. Accordingly, the closeness between the foam adhesive sheet 312 and the outer diameter side wall surface 221b of the first magnet insertion hole 221 is further improved, and the permanent magnet 311 can be more firmly fixed to the first magnet insertion hole 221.

The second permanent magnet assembly 32 is inserted into the second magnet insertion hole 222. The second permanent magnet assembly 32 includes a permanent magnet 321 and a foam adhesive sheet 322.

The permanent magnet 321 has an inner diameter surface 321a facing the inner diameter side wall surface 222a of the second magnet insertion hole 222, an outer diameter surface 321b facing the outer diameter side wall surface 222b of the second magnet insertion hole 222, a first end portion side end surface 321c extending from an end portion of the inner diameter surface 321a on the first end portion side of the magnetic pole portion 24 to an end portion of the outer diameter surface 321b on the first end portion side of the magnetic pole portion 24, and a second end portion side end surface 321d extending from an end portion of the inner diameter surface 321a on the second end portion side of the magnetic pole portion 24 to an end portion of the outer diameter surface 321b on the second end portion side of the magnetic pole portion 24.

The foam adhesive sheet 322 is closely fixed to the outer diameter surface 321b of the permanent magnet 321. That is, the foam adhesive sheet 322 is disposed between the outer diameter surface 321b of the permanent magnet 321 and the outer diameter side wall surface 222b of the second magnet insertion hole 222. The foam adhesive sheet 322 includes a foam layer 322a and an adhesive layer 322b stacked in the radial direction. The foam layer 322a is closely fixed to the outer diameter surface 321b of the permanent magnet 321. The adhesive layer 322b faces the outer diameter side wall surface 222b of the second magnet insertion hole 222. The foam layer 322a is foamed, the inner diameter surface 321a of the permanent magnet 321 is pressed against the inner diameter side wall surface 222a of the second magnet insertion hole 222, and the adhesive layer 322b is pressed against the outer diameter side wall surface 222b of the second magnet insertion hole 222.

The permanent magnet 321 is fixed to the second magnet insertion hole 222 since the foam layer 322a is foamed, the inner diameter surface 321a of the permanent magnet 321 is pressed against the outer diameter side wall surface 222a of the second magnet insertion hole 222, and the adhesive layer 322b is closely pressed against the outer diameter side wall surface 222b of the second magnet insertion hole 222. Therefore, the permanent magnet 321 can be fixed to the second magnet insertion hole 222 without injecting a resin for fixing the permanent magnet 321 to the second magnet insertion hole 222.

Since the foam adhesive sheet 322 is disposed between the outer diameter surface 321b of the permanent magnet 321 and the outer diameter side wall surface 222b of the second magnet insertion hole 222, a centrifugal force generated in the permanent magnet 321 during rotation of the rotor 1 can be received by the foam layer 322a of the foam adhesive sheet 322, and the stress generated in the rotor core 2 due to the centrifugal force accompanying the rotation of the rotor 1 can be reduced.

Further, in a region where the foam adhesive sheet 322 is disposed, a distance L2 between the permanent magnet 321 and the outer diameter side wall surface 222b of the second magnet insertion hole 222 is substantially constant.

In the region where the foam adhesive sheet 322 is disposed, the distance L2 between the permanent magnet 321 and the outer diameter side wall surface 222b of the second magnet insertion hole 222 can be substantially constant since it is not necessary to provide a resin injection hole for injecting the resin for fixing the permanent magnet 321 to the second magnet insertion hole 222. In the region where the foam adhesive sheet 322 is disposed, since the distance L2 between the permanent magnet 321 and the outer diameter side wall surface 222b of the second magnet insertion hole 222 is substantially constant, it is possible to reduce a pressing force and variability in the pressing direction by the foam of the foam layer 322a when the adhesive layer 322b is pressed against the outer diameter side wall surface 222b of the second magnet insertion hole 222. Accordingly, the closeness between the foam adhesive sheet 322 and the outer diameter side wall surface 222b of the second magnet insertion hole 222 is improved, and the permanent magnet 321 can be more firmly fixed to the second magnet insertion hole 222. Further, since it is not necessary to provide the rotor core 2 with a resin injection hole for injecting the resin for fixing the permanent magnet 321 to the second magnet insertion hole 222, the iron amount of the rotor core 2 around the permanent magnet 321 can be increased, and the output performance of the rotary electric machine is improved.

In the present embodiment, the foam adhesive sheet 322 is disposed substantially over the entire outer diameter surface 321b of the permanent magnet 321. Accordingly, the closeness between the foam adhesive sheet 322 and the outer diameter side wall surface 222b of the second magnet insertion hole 222 is further improved, and the permanent magnet 321 can be more firmly fixed to the second magnet insertion hole 222.

The third permanent magnet assembly 33 is inserted into the third magnet insertion hole 223. The third permanent magnet assembly 33 includes a permanent magnet 331 and a foam adhesive sheet 332.

The permanent magnet 331 has an inner diameter surface 331a facing the inner diameter side wall surface 223a of the third magnet insertion hole 223, an outer diameter surface 331b facing the outer diameter side wall surface 223b of the third magnet insertion hole 223, a first end portion side end surface 331c extending from an end portion of the inner diameter surface 331a on the first end portion side of the magnetic pole portion 24 to an end portion of the outer diameter surface 331b on the first end portion side of the magnetic pole portion 24, and a second end portion side end surface 331d extending from an end portion of the inner diameter surface 33a on the second end portion side of the magnetic pole portion 24 to an end portion of the outer diameter surface 331b on the second end portion side of the magnetic pole portion 24.

The foam adhesive sheet 332 is closely fixed to the outer diameter surface 331b of the permanent magnet 331. That is, the foam adhesive sheet 332 is disposed between the outer diameter surface 331b of the permanent magnet 331 and the outer diameter side wall surface 223b of the third magnet insertion hole 223. The foam adhesive sheet 332 includes a foam layer 332a and an adhesive layer 332b stacked in the radial direction. The foam layer 332a is closely fixed to the outer diameter surface 331b of the permanent magnet 331. The adhesive layer 332b faces the outer diameter side wall surface 223b of the third magnet insertion hole 223. The foam layer 332a is foamed, the inner diameter surface 331a of the permanent magnet 331 is pressed against the inner diameter side wall surface 223a of the third magnet insertion hole 223, and the adhesive layer 332b is pressed against the outer diameter side wall surface 223b of the third magnet insertion hole 223.

The permanent magnet 331 is fixed to the third magnet insertion hole 223 since the foam layer 332a is foamed, the inner diameter surface 331a of the permanent magnet 331 is pressed against the outer diameter side wall surface 223a of the third magnet insertion hole 223, and the adhesive layer 332b is closely pressed against the outer diameter side wall surface 223b of the third magnet insertion hole 223. Therefore, the permanent magnet 331 can be fixed to the third magnet insertion hole 223 without injecting a resin for fixing the permanent magnet 331 to the third magnet insertion hole 223.

Since the foam adhesive sheet 332 is disposed between the outer diameter surface 331b of the permanent magnet 331 and the outer diameter side wall surface 223b of the third magnet insertion hole 223, a centrifugal force generated in the permanent magnet 331 during rotation of the rotor 1 can be received by the foam layer 332a of the foam adhesive sheet 332, and the stress generated in the rotor core 2 due to the centrifugal force accompanying the rotation of the rotor 1 can be reduced.

Further, in a region where the foam adhesive sheet 332 is disposed, a distance L3 between the permanent magnet 331 and the outer diameter side wall surface 223b of the third magnet insertion hole 223 is substantially constant.

In the region where the foam adhesive sheet 332 is disposed, the distance L3 between the permanent magnet 331 and the outer diameter side wall surface 223b of the third magnet insertion hole 223 can be substantially constant since it is not necessary to provide a resin injection hole for injecting the resin for fixing the permanent magnet 331 to the third magnet insertion hole 223. In the region where the foam adhesive sheet 332 is disposed, since the distance L3 between the permanent magnet 331 and the outer diameter side wall surface 223b of the third magnet insertion hole 223 is substantially constant, it is possible to reduce a pressing force and variability in the pressing direction by the foam of the foam layer 332a when the adhesive layer 332b is pressed against the outer diameter side wall surface 223b of the third magnet insertion hole 223. Accordingly, the closeness between the foam adhesive sheet 332 and the outer diameter side wall surface 223b of the third magnet insertion hole 223 is improved, and the permanent magnet 331 can be more firmly fixed to the third magnet insertion hole 223. Further, since it is not necessary to provide the rotor core 2 with a resin injection hole for injecting the resin for fixing the permanent magnet 331 to the third magnet insertion hole 223, the iron amount of the rotor core 2 around the permanent magnet 331 can be increased, and the output performance of the rotary electric machine is improved.

In the present embodiment, the foam adhesive sheet 332 is disposed substantially over the entire outer diameter surface 331b of the permanent magnet 331. Accordingly, the closeness between the foam adhesive sheet 332 and the outer diameter side wall surface 223b of the third magnet insertion hole 223 is further improved, and the permanent magnet 331 can be more firmly fixed to the third magnet insertion hole 223.

[Method for Manufacturing Rotor of Rotary Electric Machine]

Next, the method for manufacturing the rotor 1 of a rotary electric machine will be described with reference to FIGS. 3 to 5.

The method for manufacturing the rotor 1 includes a permanent magnet assembly forming step of forming the first permanent magnet assembly 31, the second permanent magnet assembly 32, and the third permanent magnet assembly 33, a permanent magnet assembly inserting step of inserting the first permanent magnet assembly 31, the second permanent magnet assembly 32, and the third permanent magnet assembly 33 respectively into the first magnet insertion hole 221, the second magnet insertion hole 222, and the third magnet insertion hole 223, and a permanent magnet fixing step of fixing the permanent magnets 311, 321, and 331 of the first permanent magnet assembly 31, the second permanent magnet assembly 32, and the third permanent magnet assembly 33 inserted into the first magnet insertion hole 221, the second magnet insertion hole 222, and the third magnet insertion hole 223 respectively to the first magnet insertion hole 221, the second magnet insertion hole 222, and the third magnet insertion hole 223.

<Permanent Magnet Assembly Forming Step>

Figure 3:
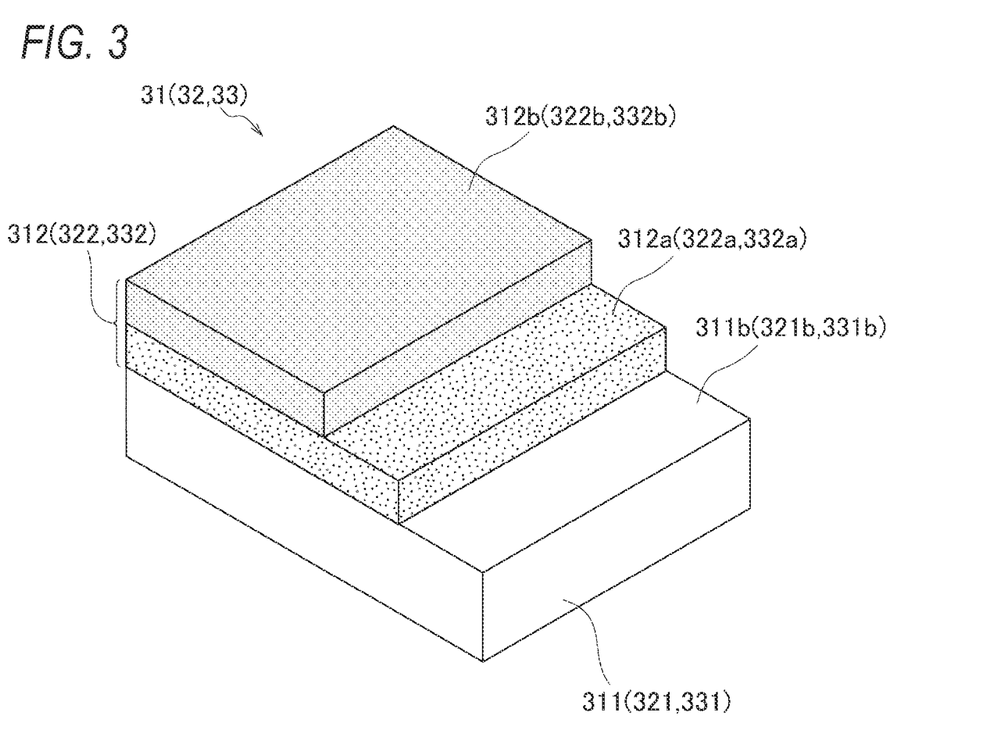
FIG. 3 illustrates a permanent magnet assembly forming step in a method for manufacturing a rotor of a rotary electric machine according to the embodiment of the present disclosure.

As illustrated in FIG. 3, in the permanent magnet assembly forming step, the foam adhesive sheets 312, 322, and 332, on which the foam layers 312a, 322a, and 332a and the adhesive layers 312b, 322b, 332b are stacked, are closely fixed to the outer diameter surfaces 311b, 321b, and 331b of the permanent magnets 311, 321, and 331 to form the first permanent magnet assembly 31, the second permanent magnet assembly 32, and the third permanent magnet assembly 33. At this time, the foam adhesive sheets 312, 322, and 332 are adhered so that the foam layers 312a, 322a, and 332a are closely fixed to the outer diameter surfaces 311b. 321b, and 331b of the permanent magnets 311, 321, and 331. The foam layers 312a, 322a, and 332a have adhesiveness, and the foam adhesive sheets 312, 322, and 332 are firmly and closely fixed to the permanent magnets 311, 321, and 331. While the foam layers 312a, 322a, and 332a are foamed by heating, the foam layers 312a, 322a, and 332a are not foamed in the permanent magnet assembly forming step. The first permanent magnet assembly 31, the second permanent magnet assembly 32, and the third permanent magnet assembly 33 have such shapes that they can be easily inserted into the first magnet insertion hole 221, the second magnet insertion hole 222, and the third magnet insertion hole 223.

<Permanent Magnet Assembly Inserting Step>

Figure 4:
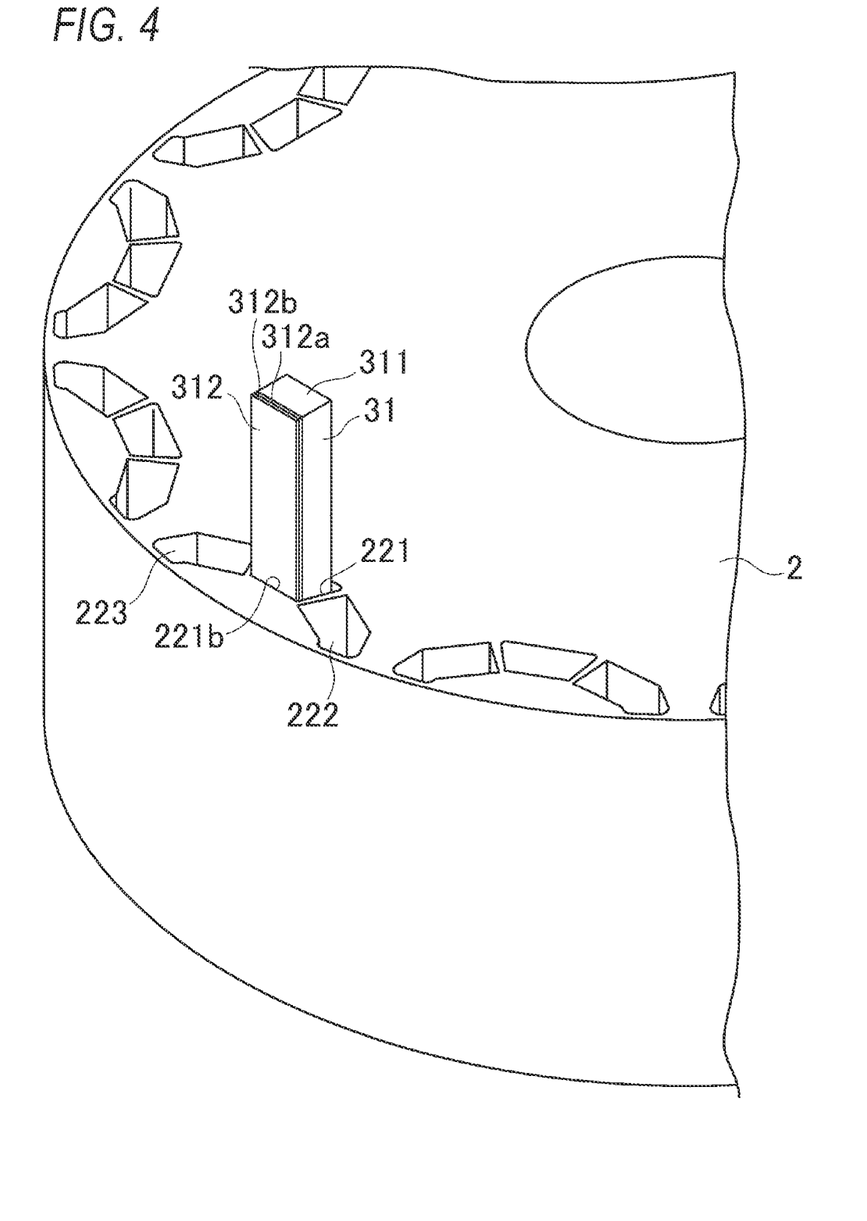
FIG. 4 illustrates a permanent magnet assembly inserting step in the method for manufacturing a rotor of a rotary electric machine according to the embodiment of the present disclosure.

Next, in the permanent magnet assembly inserting step as illustrated in FIG. 4, the first permanent magnet assembly 31 is inserted into the first magnet insertion hole 221. At this time, the first permanent magnet assembly 31 is inserted into the first magnet insertion hole 221 so that the adhesive layer 312b of the foam adhesive sheet 312 of the first permanent magnet assembly 31 faces the outer diameter side wall surface 221b of the first magnet insertion hole 221 and the inner diameter surface 311a of the permanent magnet 311 of the first permanent magnet assembly 31 faces the inner diameter side wall surface 221a of the first magnet insertion hole 221. Accordingly, the foam adhesive sheet 312 is disposed between the outer diameter surface 311b of the permanent magnet 311 and the outer diameter side wall surface 221b of the first magnet insertion hole 221.

FIG. 4 illustrates a state in which the first permanent magnet assembly 31 is inserted into the first magnet insertion hole 221. In the permanent magnet assembly inserting step, the second permanent magnet assembly 32 is inserted into the second magnet insertion hole 222 and the third permanent magnet assembly 33 is inserted into the third magnet insertion hole 223 in the same manner as the first permanent magnet assembly 31 being inserted into the first magnet insertion hole 221.

At this time, the second permanent magnet assembly 32 is inserted into the second magnet insertion hole 222 so that the adhesive layer 322b of the foam adhesive sheet 322 of the second permanent magnet assembly 32 faces the outer diameter side wall surface 222b of the second magnet insertion hole 222 and the inner diameter surface 321a of the permanent magnet 321 of the second permanent magnet assembly 32 faces the inner diameter side wall surface 222a of the second magnet insertion hole 222. Accordingly, the foam adhesive sheet 322 is disposed between the outer diameter surface 321b of the permanent magnet 321 and the outer diameter side wall surface 222b of the second magnet insertion hole 222. Similarly, the third permanent magnet assembly 33 is inserted into the third magnet insertion hole 223 so that the adhesive layer 332b of the foam adhesive sheet 332 of the third permanent magnet assembly 33 faces the outer diameter side wall surface 223b of the third magnet insertion hole 223 and the inner diameter surface 331a of the permanent magnet 331 of the third permanent magnet assembly 33 faces the inner diameter side wall surface 223a of the third magnet insertion hole 223. Accordingly, the foam adhesive sheet 332 is disposed between the outer diameter surface 331b of the permanent magnet 331 and the outer diameter side wall surface 223b of the third magnet insertion hole 223. (See FIG. 2)

<Permanent Magnet Fixing Step>

Figure 5:
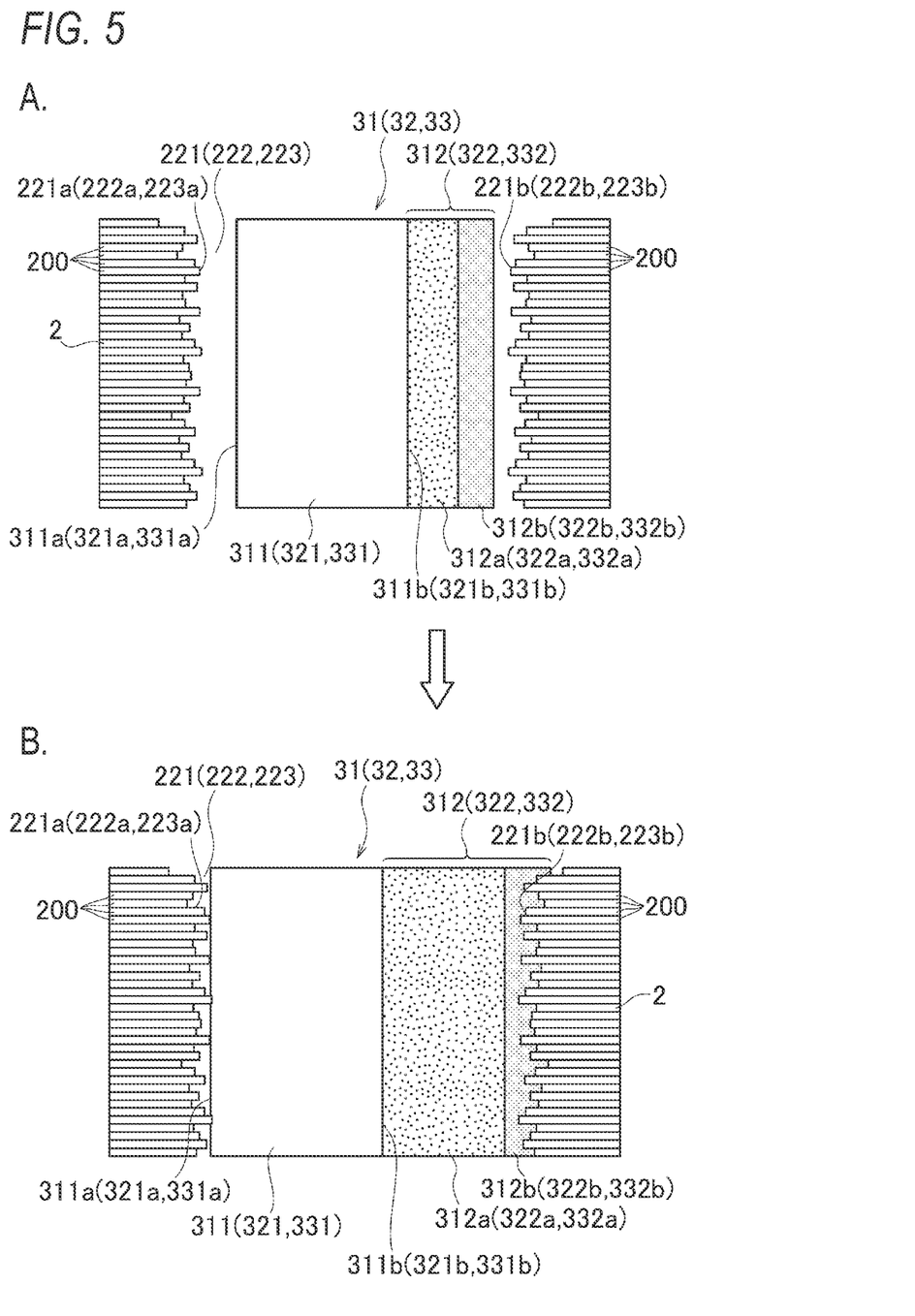
FIG. 5 illustrates a permanent magnet fixing step in the method for manufacturing a rotor of a rotary electric machine according to the embodiment of the present disclosure.

In the permanent magnet fixing step as illustrated in FIG. 5, the foam layer 312a of the first permanent magnet assembly 31 inserted into the first magnet insertion hole 221 is foamed to fix the permanent magnet 311 to the first magnet insertion hole 221. In the permanent magnet fixing step, the foam layer 312a is foamed by heating the first permanent magnet assembly 31 inserted into the first magnet insertion hole 221.

As illustrated in Section A of FIG. 5, the foam layer 312a is not foamed before the first permanent magnet assembly 31 is heated. For this reason, the first permanent magnet assembly 31 is inserted into the first magnet insertion hole 221 with a gap between the inner diameter surface 311a of the permanent magnet 311 and the inner diameter side wall surface 221a of the first magnet insertion hole 221 and between the adhesive layer 312b and the outer diameter side wall surface 221b of the first magnet insertion hole 221. Accordingly, in the permanent magnet assembly inserting step, the first permanent magnet assembly 31 can be easily inserted into the first magnet insertion hole 221.

As illustrated in Section B of FIG. 5, when the first permanent magnet assembly 31 inserted into the first magnet insertion hole 221 is heated, the foam layer 312a is foamed and expands in the radial direction. When the foam layer 312a expands in the radial direction, the inner diameter surface 311a of the permanent magnet 311 is pressed against the inner diameter side wall surface 221a of the first magnet insertion hole 221, and the adhesive layer 312b is pressed against the outer diameter side wall surface 221b of the first magnet insertion hole 221. At this time, even when the inner diameter side wall surface 221a and the outer diameter side wall surface 221b of the first magnet insertion hole 221 have unevenness in the radial direction due to the manufacturing error of the axially stacked electromagnetic steel plates 200 constituting the rotor core 2, the adhesive layer 312b is pressed against the outer diameter side wall surface 221b of the first magnet insertion hole 221 and closely bites into the unevenness of the outer diameter side wall surface 221b since the foam layer 312a is foamed and expands in the radial direction. Since the inner diameter surface 311a of the permanent magnet 311 is pressed against the outer diameter side wall surface 221a of the first magnet insertion hole 221 and the adhesive layer 312b closely bites into the outer diameter side wall surface 221b of the first magnet insertion hole 221, the permanent magnet 311 of the first permanent magnet assembly 31 is fixed to the first magnet insertion hole 221. Therefore, the permanent magnet 311 can be fixed to the first magnet insertion hole 221 without injecting the resin for fixing the permanent magnet 311 to the first magnet insertion hole 221.

FIG. 5 illustrates a method for fixing the permanent magnet 311 to the first magnet insertion hole 221 by heating the first permanent magnet assembly 31 inserted into the first magnet insertion hole 221 to foam the foam layer 312a. In the permanent magnet fixing step, the second permanent magnet assembly 32 inserted into the second magnet insertion hole 222 and the third permanent magnet assembly 33 inserted into the third magnet insertion hole 223 are heated to foam the foam layers 322a, 332a at the same time with heating the first permanent magnet assembly 31 inserted into the first magnet insertion hole 221 to foam the foam layer 312a.

When the second permanent magnet assembly 32 inserted into the second magnet insertion hole 222 is heated, the foam layer 322a is foamed and expands in the radial direction. At the same time, the adhesive layer 322b is melt and softened. When the foam layer 322a expands in the radial direction, the inner diameter surface 321a of the permanent magnet 321 is pressed against the inner diameter side wall surface 222a of the second magnet insertion hole 222 and the melt and softened adhesive layer 322b is pressed against the outer diameter side wall surface 222b of the second magnet insertion hole 222. At this time, even when the inner diameter side wall surface 222a and the outer diameter side wall surface 222b of the second magnet insertion hole 222 have unevenness in the radial direction due to the manufacturing error of the axially stacked electromagnetic steel plates 200 constituting the rotor core 2, the adhesive layer 322b is pressed against the outer diameter side wall surface 222b of the second magnet insertion hole 222 and closely bites into the unevenness of the outer diameter side wall surface 222b since the foam layer 322a is foamed and expands in the radial direction. Since the inner diameter surface 321a of the permanent magnet 321 is pressed against the outer diameter side wall surface 222a of the second magnet insertion hole 222 and the adhesive layer 322b closely bites into the outer diameter side wall surface 222b of the second magnet insertion hole 222, the permanent magnet 321 of the second permanent magnet assembly 32 is fixed to the second magnet insertion hole 222. Therefore, the permanent magnet 321 can be fixed to the second magnet insertion hole 222 without injecting the resin for fixing the permanent magnet 321 to the second magnet insertion hole 222.

Similarly, wen the third permanent magnet assembly 33 inserted into the third magnet insertion hole 223 is heated, the foam layer 332a is foamed and expands in the radial direction. When the foam layer 332a expands in the radial direction, the inner diameter surface 331a of the permanent magnet 331 is pressed against the inner diameter side wall surface 223a of the third magnet insertion hole 223 and the adhesive layer 332b is pressed against the outer diameter side wall surface 223b of the third magnet insertion hole 223. At this time, even when the inner diameter side wall surface 223a and the outer diameter side wall surface 223b of the third magnet insertion hole 223 have unevenness in the radial direction due to the manufacturing error of the axially stacked electromagnetic steel plates 200 constituting the rotor core 2, the adhesive layer 332b is pressed against the outer diameter side wall surface 223b of the third magnet insertion hole 223 and closely bites into the unevenness of the outer diameter side wall surface 223b since the foam layer 332a is foamed and expands in the radial direction. Since the inner diameter surface 331a of the permanent magnet 331 is pressed against the outer diameter side wall surface 223a of the third magnet insertion hole 223, and the adhesive layer 332b closely bites into the outer diameter side wall surface 223b of the third magnet insertion hole 223, the permanent magnet 331 of the third permanent magnet assembly 33 is fixed to the third magnet insertion hole 223.

Therefore, the permanent magnet 331 can be fixed to the third magnet insertion hole 223 without injecting the resin for fixing the permanent magnet 331 to the third magnet insertion hole 223.

In this manner, the rotor 1 of a rotary electric machine is manufactured.

In the region where the foam adhesive sheet 312 is disposed, the distance L between the permanent magnet 311 and the outer diameter side wall surface 221b of the first magnet insertion hole 221 after the permanent magnet fixing step is substantially constant. In the region where the foam adhesive sheet 322 is disposed, the distance L2 between the permanent magnet 321 and the outer diameter side wall surface 222b of the second magnet insertion hole 222 after the permanent magnet fixing step is substantially constant. In the region where the foam adhesive sheet 332 is disposed, the distance L3 between the permanent magnet 331 and the outer diameter side wall surface 223b of the third magnet insertion hole 223 after the permanent magnet fixing step is substantially constant (see FIG. 2).

In the regions where the foam adhesive sheets 312, 322, and 332 are disposed the distances L1, L2, and L3 respectively between the permanent magnets 311, 321, and 331 and the outer diameter side wall surfaces 221b, 222b, 223b of the first magnet insertion hole 221, the second magnet insertion hole 222, and the third magnet insertion hole 223 can be substantially constant since it is not necessary to provide a resin injection hole for injecting the resin for fixing the permanent magnets 311, 321, and 331 respectively to the first magnet insertion hole 221, the second magnet insertion hole 222, and the third magnet insertion hole 223. In the regions where the foam adhesive sheets 312, 322, and 332 are disposed, since the distances L1, L2, and L3 are substantially constant, it is possible to reduce pressing forces and variability in the pressing direction by the foam of the foam layers 312a, 322a, and 332a when the adhesive layers 312b, 322b, and 332b are pressed against the outer diameter side wall surfaces 221b, 222b, and 223b of the first magnet insertion hole 221, the second magnet insertion hole 222, and the third magnet insertion hole 223. Accordingly, the closeness between the foam adhesive sheets 312, 322, and 332 and the outer diameter side wall surfaces 221b. 222b, and 223b of the first magnet insertion hole 221, the second magnet insertion hole 222, and the third magnet insertion hole 223 is improved, and the permanent magnets 311, 321, and 331 can be more firmly fixed to the first magnet insertion hole 221, the second magnet insertion hole 222, and the third magnet insertion hole 223. Further, since it is not necessary to provide the rotor core 2 with a resin injection hole for injecting the resin for fixing the permanent magnets 311, 321, and 331 respectively to the first magnet insertion hole 221, the second magnet insertion hole 222, and the third magnet insertion hole 223, the iron amount of the rotor core 2 around the permanent magnets 311, 321, and 331 can be increased, and the output performance of the rotary electric machine is improved.

In the manufacturing of the rotor 1 of a rotary electric machine, the adhesive layer 312b before heating has a smaller friction coefficient between the first magnet insertion hole 221 and the adhesive layer 312b as compared with a friction coefficient of the adhesive layer 312b after heating. Similarly, the adhesive layer 322b before heating has a smaller friction coefficient between the second magnet insertion hole 222 and the adhesive layer 322b as compared with a friction coefficient of the adhesive layer 322b after heating, and the adhesive layer 332b before heating has a smaller friction coefficient between the third magnet insertion hole 223 and the adhesive layer 332b as compared with a friction coefficient of the adhesive layer 332b after heating. Therefore, when the first permanent magnet assembly 31, the second permanent magnet assembly 32, and the third permanent magnet assembly 33 are inserted respectively into the first magnet insertion hole 221, the second magnet insertion hole 222, and the third magnet insertion hole 223 in the permanent magnet assembly inserting step, the first permanent magnet assembly 31, the second permanent magnet assembly 32, and the third permanent magnet assembly 33 can be prevented from being caught by the first magnet insertion hole 221, the second magnet insertion hole 222, and the third magnet insertion hole 223 even when the first permanent magnet assembly 31, the second permanent magnet assembly 32, and the third permanent magnet assembly 33 contact with the first magnet insertion hole 221, the second magnet insertion hole 222, and the third magnet insertion hole 223 since the friction coefficients therebetween are small.

Accordingly, the first permanent magnet assembly 31, the second permanent magnet assembly 32, and the third permanent magnet assembly 33 can be easily inserted into the first magnet insertion hole 221, the second magnet insertion hole 222, and the third magnet insertion hole 223. When the first permanent magnet assembly 31, the second permanent magnet assembly 32, and the third permanent magnet assembly 33 are inserted into the first magnet insertion hole 221, the second magnet insertion hole 222, and the third magnet insertion hole 223, the first permanent magnet assembly 31, the second permanent magnet assembly 32, and the third permanent magnet assembly 33 can be prevented from being caught by the first magnet insertion hole 221, the second magnet insertion hole 222, and the third magnet insertion hole 223, and the foam adhesive sheets 312, 322, and 332 can be prevented from being peeled off from the permanent magnets 311, 321, and 331.

Although the embodiment of the present disclosure has been described above, the present disclosure is not limited thereto and modifications, improvements, or the like can be made as appropriate.

For example, the magnetic pole portion 24 may be constituted by two magnets disposed in two magnet insertion holes arranged in a substantially V-shape opening radially toward, or be constituted by one circular arc magnet disposed in one magnet insertion hole formed in an arc shape protruding radially inward.

For example, the foam adhesive sheet 312 is disposed between the outer diameter surface 311b of the permanent magnet 311 and the outer diameter side wall surface 221b of the first magnet insertion hole 221, the foam adhesive sheet 322 is disposed between the outer diameter surface 321b of the permanent magnet 321 and the outer diameter side wall surface 222b of the second magnet insertion hole 222, the foam adhesive sheet 332 is disposed between the outer diameter surface 331b of the permanent magnet 331 and the outer diameter side wall surface 223b of the third magnet insertion hole 223. However, the foam adhesive sheet 312 may be disposed between the inner diameter surface 311a of the permanent magnet 311 and the inner diameter side wall surface 221a of the first magnet insertion hole 221, the foam adhesive sheet 322 may be disposed between the inner diameter surface 321a of the permanent magnet 321 and the inner diameter side wall surface 222a of the second magnet insertion hole 222, and the foam adhesive sheet 332 may be disposed between the inner diameter surface 331a of the permanent magnet 331 and the inner diameter side wall surface 223a of the third magnet insertion hole 223.

For example, the foam adhesive sheet 312 may include a layer other than the foam layer 322*a* and the adhesive layer 322*b*.

At least the following matters are described in the present specification. Although corresponding constituent elements or the like in the above embodiment are shown in parentheses, the present disclosure is not limited thereto.

(1) A rotor (rotor 1) of a rotary electric machine, includes:

a substantially annular rotor core (rotor core 2) having a plurality of magnet insertion holes (magnet insertion hole 22, first magnet insertion hole 221, second magnet insertion hole 222, third magnet insertion hole 223) arranged along a circumferential direction; and a plurality of permanent magnets (permanent magnets 311, 321, 331) inserted into the plurality of magnet insertion holes, in which a magnet insertion hole of the plurality of magnet insertion holes has an inner diameter side wall surface (inner diameter side wall surfaces 221*a*, 222*a*, 223*a*) extending in the circumferential direction on a radially inner side and an outer diameter side wall surface (outer diameter side wall surfaces 221*b*, 222*b*, 223*b*) extending in the circumferential direction on a radially outer side relative to the inner diameter side wall surface, in which a permanent magnet of the plurality of permanent magnets has an inner diameter surface (inner diameter surfaces 311*a*, 321*a*, 331*a*) facing the inner diameter side wall surface of the magnet insertion hole and an outer diameter surface (outer diameter surfaces 311*b*, 321*b*, 331*b*) facing the outer diameter side wall surface of the magnet insertion hole, in which the rotor further includes: a foam adhesive sheet (foam adhesive sheets 312, 322, 332) provided at least either between the inner diameter surface of the permanent magnet and the inner diameter side wall surface of the magnet insertion hole or between the outer diameter surface of the permanent magnet and the outer diameter side wall surface of the magnet insertion hole, the foam adhesive sheet including a foam layer (foam layers 312*a*, 322*a*. 332*a*) and an adhesive layer (adhesive layers 312*b*, 322*b*, 332*b*) stacked in a radial direction, in which the foam layer is closely fixed to the permanent magnet, in which the adhesive layer faces the magnet insertion hole, and in which the foam layer is foamed the adhesive layer closely contacts with the magnet insertion hole, and the permanent magnet is fixed to the magnet insertion hole.

According to (1), the rotor of a rotary electric machine includes a foam adhesive sheet provided at least either between the inner diameter surface of the permanent magnet and the inner diameter side wall surface of the magnet insertion hole or between the outer diameter surface of the permanent magnet and the outer diameter side wall surface of the magnet insertion hole, the foam adhesive sheet includes a foam layer and an adhesive layer stacked in a radial direction, the foam layer is closely fixed to the permanent magnet, the adhesive layer faces the magnet insertion hole, and the foam layer is foamed, the adhesive layer closely contacts with the magnet insertion hole, and the permanent magnet is fixed to the magnet insertion hole. Therefore, the permanent magnet can be fixed to the magnet insertion hole without injecting a resin for fixing the permanent magnet to the magnet insertion hole.

(2) The rotor of a rotary electric machine, according to (1), in which the adhesive layer before heating has a smaller friction coefficient between the adhesive layer and the magnet insertion hole as compared with a friction coefficient of the adhesive layer after heating.

According to (2), the adhesive layer before heating has a smaller friction coefficient between the adhesive layer and the magnet insertion hole as compared with a friction coefficient of the adhesive layer after heating. Therefore, when the permanent magnet to which the foam adhesive sheet is closely fixed is inserted into the magnet insertion hole, the permanent magnet to which the foam adhesive sheet is adhered can be easily inserted into the magnet insertion hole, and the foam adhesive sheet can be prevented from peeling off from the permanent magnet.

(3) The rotor of a rotary electric machine, according to (1) or (2), in which in a region where the form adhesive sheet is disposed, a distance (distances L1, L2, L3) between the permanent magnet and the magnet insertion hole is substantially constant.

According to (3), in a region where the foam adhesive sheet is disposed, a distance between the permanent magnet and the magnet insertion hole can be made substantially constant since it is not necessary to provide the magnet insertion hole with a resin injection hole for injecting the resin for fixing the permanent magnet to the magnet insertion hole. Accordingly, the closeness between the foam adhesive sheet and the magnet insertion hole is improved, and the permanent magnet can be more firmly fixed to the magnet insertion hole. Further, an iron amount of the rotor core around the permanent magnet can be increased, and the output performance of the rotary electric machine is improved.

(4) The rotor of a rotary electric machine, according to any one of (1) to (3), in which the foam adhesive sheet is disposed between the outer diameter surface of the permanent magnet and the outer diameter side wall surface of the magnet insertion hole.

According to (4), the foam adhesive sheet is disposed between the outer diameter surface of the permanent magnet and the outer diameter side wall surface of the magnet insertion hole. Therefore, a centrifugal force generated in the permanent magnet during rotation of the rotor can be received by the foam layer of the foam adhesive sheet, and the stress generated in the rotor core due to the centrifugal force accompanying the rotation of the rotor can be reduced.

(5) A permanent magnet assembly (permanent magnet assembly 3, first permanent magnet assembly 31, second permanent magnet assembly 32, and third permanent magnet assembly 33) includes:

a permanent magnet (permanent magnets 311, 321, 331) and a foam adhesive sheet (foam adhesive sheets 312, 322, 332) closely fixed to at least one side surface of the permanent magnet, in which the permanent magnet assembly is inserted into a magnet insertion hole (first magnet insertion hole 221, second magnet insertion hole 222, third magnet insertion hole 223) formed in a substantially annular rotor core (rotor core 2), and in which the foam adhesive sheet includes a foam layer (foam layers 312*a*, 322*a*, 332*a*) and an adhesive layer (adhesive layers 312*b*, 322*b*, 332*b*) stacked with each other, and the foam layer is closely fixed to the permanent magnet.

According to (5), the permanent magnet assembly inserted into the magnet insertion hole formed in the rotor core includes a permanent magnet and a foam adhesive sheet closely fixed to at least one side surface of the permanent magnet, the foam adhesive sheet includes a foam layer and an adhesive layer stacked with each other, and the foam layer is closely fixed to the permanent magnet. Therefore, the adhesive layer can closely contacts with the magnet insertion hole by foaming the foam layer and the permanent magnet can be fixed to the magnet insertion hole. Therefore, the permanent magnet can be fixed to the magnet insertion hole without injecting the resin for fixing the permanent magnet to the magnet insertion hole.

(6) The permanent magnet assembly, according to (5), in which the adhesive layer before heating has a smaller friction coefficient between the adhesive layer and the magnet insertion hole as compared with a friction coefficient of the adhesive layer after heating.

According to (6), the adhesive layer before heating has a smaller friction coefficient between the adhesive layer and the magnet insertion hole as compared with a friction coefficient of the adhesive layer after heating. Therefore, when the permanent magnet assembly is inserted into the magnet insertion hole, the permanent magnet assembly can be easily inserted into the magnet insertion hole, and the foam adhesive sheet can be prevented from peeling off from the permanent magnet.

(7) A method for manufacturing a rotor (rotor 1) of a rotary electric machine, the rotor including:

a substantially annular rotor core (rotor core 2) having a plurality of magnet insertion holes (magnet insertion hole 22, first magnet insertion holes 221, second magnet insertion holes 222, third magnet insertion holes 223) arranged along a circumferential direction; and a plurality of permanent magnets (permanent magnets 311, 321, 331) inserted into the plurality of magnet insertion holes, in which a magnet insertion hole of the plurality of magnet insertion holes having an inner diameter side wall surface (inner diameter side wall surfaces 221a, 222a, 223a) extending in the circumferential direction on a radially inner side and an outer diameter side wall surface (outer diameter side wall surfaces 221b, 222b, 223b) extending in the circumferential direction on a radially outer side relative to the inner diameter side wall surface, in which a permanent magnet of the plurality of permanent magnets having an inner diameter surface (inner diameter surfaces 311a, 321a, 331a) facing the inner diameter side wall surface of the magnet insertion hole and an outer diameter surface (outer diameter surfaces 311b, 321b, 331b) facing the outer diameter side wall surface of the magnet insertion hole, in which the method comprising:

a permanent magnet assembly forming step in which a foam adhesive sheet (foam adhesive sheets 312, 322, 332) is closely fixed to at least one of the inner diameter surface and the outer diameter surface of the permanent magnet to form a permanent magnet assembly (permanent magnet assembly 3, first permanent magnet assembly 31, second permanent magnet assembly 32, third permanent magnet assembly 33), the foam adhesive sheet including a foam layer (foam layers 312a, 322a, 332a) and an adhesive layer (adhesive layers 312b, 322b, 332b) stacked in a radial direction;

a permanent magnet assembly inserting step in which the permanent magnet assembly is inserted into the magnet insertion hole; and a permanent magnet fixing step in which the permanent magnet is fixed to the magnet insertion hole by foaming the foam layer of the permanent magnet assembly inserted into the magnet insertion hole, in which in the permanent magnet assembly forming step, the foam adhesive sheet is closely fixed to the permanent magnet so that the foam layer is closely fixed to the permanent magnet, in which in the permanent magnet assembly inserting step, the permanent magnet assembly is inserted into the magnet insertion hole so that the adhesive layer faces the magnet insertion hole, and in which in the permanent magnet fixing step, the foam layer is foamed by heating the permanent magnet assembly inserted into the magnet insertion hole, the adhesive layer closely contacts with the magnet insertion hole, and thereby the permanent magnet is fixed to the magnet insertion hole.

According to (7), in the permanent magnet assembly forming step, the foam adhesive sheet is closely fixed to at least one of the inner diameter surface and the outer diameter surface of the permanent magnet to form a permanent magnet assembly, the foam adhesive sheet includes a foam layer and an adhesive layer stacked in a radial direction, in the permanent magnet assembly inserting step, the permanent magnet assembly is inserted into the magnet insertion hole so that the adhesive layer faces the magnet insertion hole, and in the permanent magnet fixing step, the foam layer is foamed by heating, the adhesive layer is in close contact with the magnet insertion hole, and thereby the permanent magnet is fixed to the magnet insertion hole. Therefore, the permanent magnet can be fixed to the magnet insertion hole without injecting the resin for fixing the permanent magnet to the magnet insertion hole.

(8) The method for manufacturing the rotor of the rotary electric machine, according to (7), in which the adhesive layer before heating has a smaller friction coefficient between the adhesive layer and the magnet insertion hole as compared with a friction coefficient of the adhesive layer after heating.

According to (8), the adhesive layer before heating has a smaller friction coefficient between the adhesive layer and the magnet insertion hole as compared with a friction coefficient of the adhesive layer after heating. Therefore, in the permanent magnet assembly inserting step, the permanent magnet assembly can be easily inserted into the magnet insertion hole, and the foam adhesive sheet can be prevented from peeling off from the permanent magnet.

(9) The method for manufacturing the rotor of the rotary electric machine, according to (7) or (8), in which in a region where the foam adhesive sheet is disposed, a distance (distances L1, L2, L3) between the permanent magnet and the magnet insertion hole is substantially constant after the permanent magnet fixing step.

According to (9), in the region where the foam adhesive sheet is disposed, the distance between the permanent magnet and the magnet insertion hole can be made substantially constant after the permanent magnet fixing step since it is not necessary to provide the magnet insertion hole with a resin injection hole for injecting the resin for fixing the permanent magnet to the magnet insertion hole. Accordingly, the closeness between the foam adhesive sheet and the magnet insertion hole is improved, and the permanent magnet can be more firmly fixed. Further, an iron amount of the rotor core around the permanent magnet can be increased, and the output performance of the rotary electric machine is improved.

(10) The method for manufacturing the rotor of the rotary electric machine, according to any one of (7) to (9), in which in the permanent magnet assembly forming step, the foam adhesive sheet is closely fixed to the outer diameter surface of the permanent magnet, and in which in the permanent magnet assembly inserting step, the permanent magnet assembly is inserted into the magnet insertion hole so that the adhesive layer faces the outer diameter side wall surface of the magnet insertion hole.

According to (10), in the permanent magnet assembly forming step, the foam adhesive sheet is closely fixed to the outer diameter surface of the permanent magnet, and in the permanent magnet assembly inserting step, the permanent magnet assembly is inserted into the magnet insertion hole so that the adhesive layer faces the outer diameter side wall surface of the magnet insertion hole. Therefore, the foam adhesive sheet is disposed between the outer diameter surface of the permanent magnet and the outer diameter side wall surface of the magnet insertion hole. Accordingly, a centrifugal force generated in the permanent magnet during rotation of the rotor can be received by the foam layer of the foam adhesive sheet, and the stress generated in the rotor core due to the centrifugal force accompanying the rotation of the rotor can be reduced.

What is claimed is:

1. A rotor of a rotary electric machine, comprising:
a substantially annular rotor core having a plurality of magnet insertion holes arranged along a circumferential direction; and
a plurality of permanent magnets inserted into the plurality of magnet insertion holes,
wherein a magnet insertion hole of the plurality of magnet insertion holes has an inner diameter side wall surface extending in the circumferential direction on a radially inner side and an outer diameter side wall surface extending in the circumferential direction on a radially outer side relative to the inner diameter side wall surface,
wherein a permanent magnet of the plurality of permanent magnets has an inner diameter surface facing the inner diameter side wall surface of the magnet insertion hole and an outer diameter surface facing the outer diameter side wall surface of the magnet insertion hole,
wherein the rotor further comprises: a foam adhesive sheet provided at least either between the inner diameter surface of the permanent magnet and the inner diameter side wall surface of the magnet insertion hole or between the outer diameter surface of the permanent magnet and the outer diameter side wall surface of the magnet insertion hole, the foam adhesive sheet including a foam layer and an adhesive layer stacked in a radial direction,
wherein the foam layer is closely fixed to the permanent magnet,
wherein the adhesive layer faces the magnet insertion hole,
wherein the foam layer is foamed, the adhesive layer closely contacts with the magnet insertion hole, and the permanent magnet is fixed to the magnet insertion hole, and
wherein the foam layer is not in contact with the magnet insertion hole.

2. The rotor of a rotary electric machine, according to claim 1,
wherein the adhesive layer before heating has a smaller friction coefficient between the adhesive layer and the magnet insertion hole as compared with a friction coefficient of the adhesive layer after heating.

3. The rotor of a rotary electric machine, according to claim 1,
wherein in a region where the form adhesive sheet is disposed, a distance between the permanent magnet and the magnet insertion hole is substantially constant.

4. The rotor of a rotary electric machine, according to claim 1,
wherein the foam adhesive sheet is disposed between the outer diameter surface of the permanent magnet and the outer diameter side wall surface of the magnet insertion hole.

5. The rotor of the rotary electric machine, according to claim 1, wherein the foam adhesive is provided only between the outer diameter surface of the permanent magnet and the outer diameter side wall surface of the magnet insertion hole.

6. A permanent magnet assembly comprising:
a permanent magnet; and
a foam adhesive sheet closely fixed to at least one side surface of the permanent magnet,
wherein the permanent magnet assembly is inserted into a magnet insertion hole formed in a substantially annular rotor core,
wherein the foam adhesive sheet includes a foam layer and an adhesive layer stacked with each other, and the foam layer is closely fixed to the permanent magnet, and
wherein the foam layer is not in contact with the magnet insertion hole.

7. The permanent magnet assembly, according to claim 6,
wherein the adhesive layer before heating has a smaller friction coefficient between the adhesive layer and the magnet insertion hole as compared with a friction coefficient of the adhesive layer after heating.

8. The permanent magnet assembly according to claim 6,
wherein the foam adhesive sheet is closely fixed to only one side surface of the permanent magnet,
wherein the magnet insertion hole has an inner diameter side wall surface extending in a circumferential direction on a radially inner side and an outer diameter side wall surface extending in the circumferential direction on a radially outer side relative to the inner diameter side wall surface,
wherein the permanent magnet has an inner diameter surface facing the inner diameter side wall surface of the magnet insertion hole and an outer diameter surface facing the outer diameter side wall surface of the magnet insertion hole, and
wherein the foam adhesive is provided only between the outer diameter surface of the permanent magnet and the outer diameter side wall surface of the magnet insertion hole.

9. A method for manufacturing a rotor of a rotary electric machine, the rotor including:
a substantially annular rotor core having a plurality of magnet insertion holes arranged along a circumferential direction; and
a plurality of permanent magnets inserted into the plurality of magnet insertion holes,
a magnet insertion hole of the plurality of magnet insertion holes having an inner diameter side wall surface extending in the circumferential direction on a radially inner side and an outer diameter side wall surface extending in the circumferential direction on a radially outer side relative to the inner diameter side wall surface, a permanent magnet of the permanent magnets having an inner diameter surface facing the inner diameter side wall surface of the magnet insertion hole and an outer diameter surface facing the outer diameter side wall surface of the magnet insertion hole, the method comprising:

a permanent magnet assembly forming step in which a foam adhesive sheet is closely fixed to at least one of the inner diameter surface and the outer diameter surface of the permanent magnet to form a permanent magnet assembly, the foam adhesive sheet including a foam layer and an adhesive layer stacked in a radial direction;

a permanent magnet assembly inserting step in which the permanent magnet assembly is inserted into the magnet insertion hole; and a permanent magnet fixing step in which the permanent magnet is fixed to the magnet insertion hole by foaming the foam layer of the permanent magnet assembly inserted into the magnet insertion hole, wherein in the permanent magnet assembly forming step, the foam adhesive sheet is closely fixed to the permanent magnet so that the foam layer is closely fixed to the permanent magnet, wherein in the permanent magnet assembly inserting step, the permanent magnet assembly is inserted into the magnet insertion hole so that the adhesive layer faces the magnet insertion hole, wherein in the permanent magnet fixing step, the foam layer is foamed by heating the permanent magnet assembly inserted into the magnet insertion hole, the adhesive layer closely contacts with the magnet insertion hole, and thereby the permanent magnet is fixed to the magnet insertion hole, and wherein the foam layer is not in contact with the magnet insertion hole.

10. The method for manufacturing the rotor of the rotary electric machine, according to claim 9, wherein the adhesive layer before heating has a smaller friction coefficient between the adhesive layer and the magnet insertion hole as compared with a friction coefficient of the adhesive layer after heating.

11. The method for manufacturing the rotor of the rotary electric machine, according to claim 9, wherein in a region where the foam adhesive sheet is disposed, a distance between the permanent magnet and the magnet insertion hole is substantially constant after the permanent magnet fixing step.

12. The method for manufacturing the rotor of the rotary electric machine, according to claim 9, wherein in the permanent magnet assembly forming step, the foam adhesive sheet is closely fixed to the outer diameter surface of the permanent magnet, and wherein in the permanent magnet assembly inserting step, the permanent magnet assembly is inserted into the magnet insertion hole so that the adhesive layer faces the outer diameter side wall surface of the magnet insertion hole.

13. The method for manufacturing the rotor of the rotary electric machine, according to claim 9, wherein in the permanent magnet assembly forming step, the foam adhesive sheet is closely fixed to only the outer diameter surface of the permanent magnet.

* * * * *